(12) United States Patent
Gutoski et al.

(10) Patent No.: US 9,942,039 B1
(45) Date of Patent: Apr. 10, 2018

(54) APPLYING MODULAR REDUCTIONS IN CRYPTOGRAPHIC PROTOCOLS

(71) Applicant: ISARA Corporation, Waterloo (CA)

(72) Inventors: Gustav Michael Gutoski, Waterloo (CA); Shane Daniel Kelly, Waterloo (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/267,445

(22) Filed: Sep. 16, 2016

(51) Int. Cl.
*H04L 9/30* (2006.01)
*H04L 9/08* (2006.01)

(52) U.S. Cl.
CPC .......... *H04L 9/3093* (2013.01); *H04L 9/0852* (2013.01); *H04L 2209/12* (2013.01); *H04L 2209/24* (2013.01)

(58) Field of Classification Search
CPC . H04L 9/3093; H04L 9/0852; H04L 2209/12; H04L 2209/24
See application file for complete search history.

(56) References Cited

U.S. PATENT DOCUMENTS

| | | | | |
|---|---|---|---|---|
| 2007/0055879 A1* | 3/2007 | Luo | .......................... | H04L 9/302 713/171 |
| 2007/0100925 A1* | 5/2007 | Fischer | ................... | G06F 7/722 708/620 |
| 2007/0297601 A1* | 12/2007 | Hasenplaugh | ............ | G06F 7/72 380/28 |
| 2008/0144810 A1* | 6/2008 | Gopal | ..................... | G06F 7/723 380/30 |
| 2009/0003593 A1* | 1/2009 | Gopal | ................... | G06F 7/5324 380/30 |
| 2009/0003595 A1* | 1/2009 | Ozturk | ...................... | G06F 7/72 380/30 |
| 2013/0216044 A1* | 8/2013 | Gentry | .................... | H04L 9/008 380/277 |
| 2015/0288524 A1* | 10/2015 | Jaffe | ........................ | H04L 9/004 713/176 |

OTHER PUBLICATIONS

Menezes, A.J., Van Oorschot, P.C. and Vanstone, S.A., 1996. Handbook of applied cryptography. CRC press. (Chapter 14 only).*

(Continued)

*Primary Examiner* — James R Turchen
(74) *Attorney, Agent, or Firm* — Henry Patent Law Firm PLLC (57) ABSTRACT

In a general aspect, approximate modular reductions are applied in cryptographic protocols. In some aspects, an array of integers defined for a lattice-based cryptography system is obtained. A transformation is applied to the array of integers, which includes applying a modular reduction to a product of a first integer and a second integer. The first integer is based on the array of integers, and the second integer is based on the transformation. Applying the modular reduction includes operations mathematically equivalent to multiplying the product by a first constant to yield a first intermediate value, applying a bit shift operation to the first intermediate value to yield a second intermediate value, multiplying the second intermediate value by a modulus value to yield a third intermediate value, and subtracting the third intermediate value from the product.

24 Claims, 2 Drawing Sheets

(56) References Cited

OTHER PUBLICATIONS

Alkim et al., Post-quantum key exchange—a new hope, Aug. 2016, 23 pages.
Logna et al., Speeding up the Number Theoretic Transform for Faster Ideal Lattice-Based Cryptography, Jul. 2016, 18 pages.
Poppelmann et al., High-Performance Ideal Lattice-Based Cryptography on 8-bit Atxmega Microcontrollers, Jun. 2015 21 pages.
Wikipedia, Barrett reduction, Jul. 2016, 4 pages.
Tommila, Number Theoretic Transforms, Mar. 1997, 3 pages.
Scott, Michael, "A note on the implementation of the Number Theoretic Transform", Cryptology ePrint Archive, Report 2017/727, Sep. 13, 2017, 14 pages.

\* cited by examiner

Fig. 1

$$\text{for } (m,k) \leftarrow \left(1,\tfrac{n}{2}\right), \left(2,\tfrac{n}{4}\right), \left(4,\tfrac{n}{8}\right), \ldots, \left(\tfrac{n}{2},1\right), \text{do:}$$
$$\quad \text{for } i \leftarrow 0, \ldots, m-1, \text{do:}$$
$$\quad\quad \text{start} \leftarrow 2 \times i \times k$$
$$\quad\quad \text{finish} \leftarrow \text{start} + k - 1$$
$$\quad\quad \text{for } j \leftarrow \text{start}, \ldots, \text{finish}, \text{do:}$$
$$\quad\quad\quad U \leftarrow a[j]$$
$$\quad\quad\quad V \leftarrow \text{modular}(a[j+k] \times \psi[m+i])$$
$$\quad\quad\quad a[j] \leftarrow (U+V)$$
$$\quad\quad\quad a[j+k] \leftarrow (U-V)$$
$$\quad\quad \text{end for}$$
$$\quad \text{end for}$$
$$\text{end for}$$
$$\text{return } a$$

$$\text{for } (m,k) \leftarrow \left(\tfrac{n}{2},1\right), \left(\tfrac{n}{4},2\right), \left(\tfrac{n}{8},4\right), \ldots, \left(1,\tfrac{n}{2}\right), \text{do:}$$
$$\quad \text{for } i \leftarrow 0, \ldots, m-1, \text{do:}$$
$$\quad\quad \text{start} \leftarrow 2 \times i \times k$$
$$\quad\quad \text{finish} \leftarrow \text{start} + k - 1$$
$$\quad\quad \text{for } j \leftarrow \text{start}, \ldots, \text{finish}, \text{do:}$$
$$\quad\quad\quad U \leftarrow a[j]$$
$$\quad\quad\quad V \leftarrow a[j+k]$$
$$\quad\quad\quad a[j] \leftarrow U+V$$
$$\quad\quad\quad a[j+k] \leftarrow \text{modular}((U-V) \times \psi^{-1}[m+i])$$
$$\quad\quad \text{end for}$$
$$\quad \text{end for}$$
$$\text{end for}$$
$$\text{for } j \leftarrow 0, \ldots, n-1, \text{do:}$$
$$\quad a[j] \leftarrow \text{modular}(a[j] \times n^{-1})$$
$$\text{end for}$$
$$\text{return } a$$

APPLYING MODULAR REDUCTIONS IN CRYPTOGRAPHIC PROTOCOLS

BACKGROUND

The following description relates to applying modular reductions in cryptographic protocols.

Cryptography systems are used to communicate securely over public channels. For example, some cryptography systems allow messages to be encrypted by a public key and decrypted by a private key. Certain transformations, such as a number theoretic transformation (NTT) and its inverse, may be used in cryptographic protocols.

DETAILED DESCRIPTION

In some aspects of the present disclosure, approximate modular reductions are applied in cryptographic protocols. The modular reductions may be applied to the result of multiplication operations performed in transformations, without the need to apply modular reductions to the result of addition operations in such transformations. Transformations such as the number theoretic transformation (NTT) and its inverse are used extensively in cryptography systems. As an example, a recently-proposed cryptography system referred to as the "New Hope" protocol (see "Post-quantum key exchange—a new hope," by Erdem Alkim, Léo Ducas, Thomas Pöppelmann, and Peter Schwabe, August 2016) utilizes an NTT and inverse-NTT to provide quantum-resistant cryptographic communications. The performance of many lattice-based cryptography systems, such as the New Hope protocol, may be improved by faster and more computationally efficient implementations of an NTT or other transformations. An implementation of an NTT or inverse-NTT may refer to a set of operations that computes an NTT or inverse-NTT, respectively, for a given input.

In some instances, a transformation may be applied in a cryptographic protocol to an array of integers. The transformation may perform an approximate modular reduction to one or more integer values in the array of integers. Because determining the unique remainder using an exact modular reduction may be computationally inefficient, it may be preferable to employ an approximate modular reduction operation instead, wherein an approximate remainder $r'$ is determined instead of the unique remainder $r$. An approximate modular reduction may refer to determining an approximate remainder of a division operation that is congruent to the unique remainder of the division operation (which may be determined using an exact modular reduction). For example, given a positive integer $q$ and a non-negative integer $\alpha$, an exact modular reduction may determine the unique integer remainder $r$ (where $0 \leq r \leq q$) obtained when $\alpha$ is divided by $q$. The approximate remainder $r'$ determined by an approximate modular reduction, however, need not be less than the modulus $q$. Instead, the approximate remainder $r'$ output by the approximate modular reduction may be congruent to $\alpha$ modulo $q$ (i.e., $r' \equiv \alpha \pmod{q}$), with $0 \leq r' < A$ for some positive integer $A$ that is not much larger than $q$.

In some instances, a Barrett reduction may be performed in an implementation of an NTT or inverse-NTT. A Barrett-type modular reduction may determine an approximate remainder using operations that are mathematically equivalent to multiplying an input by a first constant, applying a bit shift operation, dividing by a second constant, and then subtracting the result of those operations from the input. Mathematically equivalent operations may refer to a sequence of operations that provide an output that is the same as the operations listed as being performed (e.g., by changing an order of the operations). For example, certain individual operations may be performed as a mathematically equivalent operation (e.g., a bit shift operation may be performed as a mathematically equivalent division operation; division may be performed as a mathematically equivalent multiplication by an inverse; etc.); certain pairs of operations may be performed in another order (e.g., multiplication and division; addition and subtraction); multiple operations may be combined as a single operation; a single operation may be split into multiple operations; etc.

In some instances, the Barrett-type modular reduction may be performed after multiplication operations performed in implementations of an NTT or an inverse-NTT, but not after addition operations in such implementations. Performing a Barrett-type modular reduction with particular parameters, for instance, may eliminate the need to perform modular reductions after addition operations in implementations of an NTT or an inverse-NTT, allowing for fewer modular reductions to be performed in each transformation. In some instances, the Barrett-type modular reduction is performed in an implementation of an NTT that uses a Cooley-Tukey butterfly operation. In some instances, the Barrett-type modular reduction is performed in an implementation of an inverse-NTT that uses a Gentleman-Sande butterfly operation.

Aspects of the present disclosure may allow for larger integer inputs (e.g., 36 bit integers) to modular reduction operations used in transformations. Such modular reduction operations may accommodate larger computer bit register sizes (e.g., 64 bit registers). In some aspects, the amount of computational resources needed during transformations may be reduced and the performance of cryptographic protocols using such transformations may be improved. Aspects of the present disclosure may be implemented in a manner that does not require switching among residue classes in transformations, such as an NTT or inverse-NTT, which may eliminate or reduce the need for pre-processing of inputs to or post-processing of outputs of modular reduction operations. For example, aspects of the present disclosure may be applied to an implementation of an NTT or inverse-NTT to reduce the amount of modular reductions performed during lattice-based cryptographic protocols, such as the New Hope protocol, resulting in faster transformations and thus faster cryptographic protocols.

Figure 1:
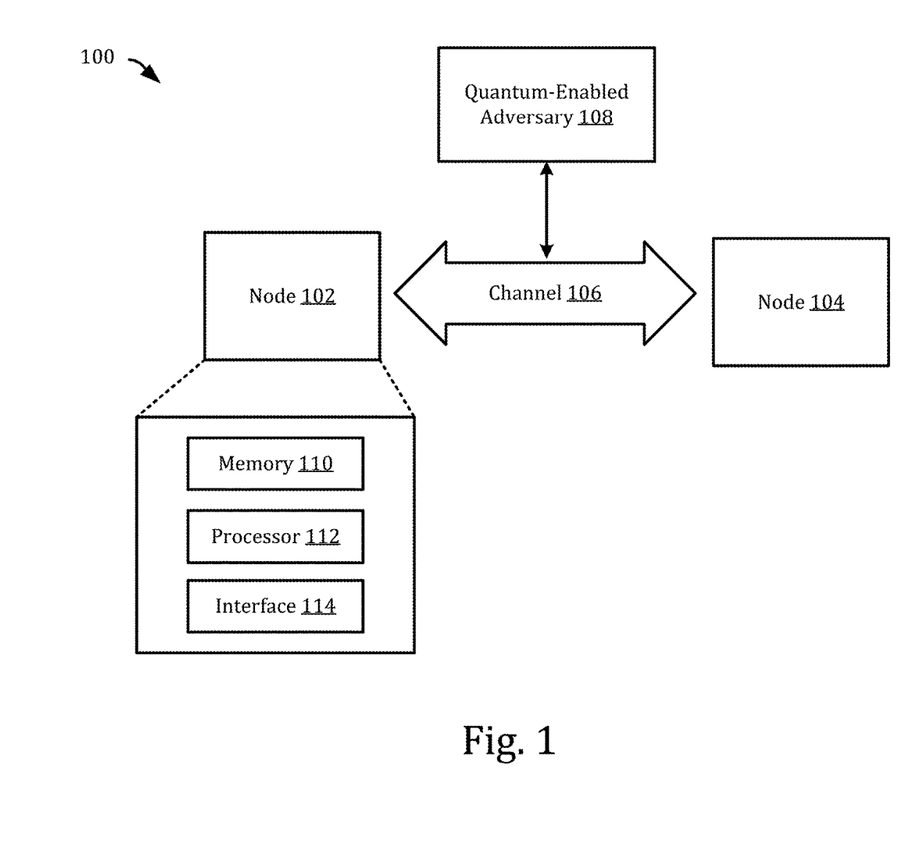
FIG. 1 is a block diagram showing aspects of an example communication system.

FIG. 1 is a block diagram showing aspects of an example communication system 100. The example communication system 100 shown in FIG. 1 includes two nodes 102, 104 that use a cryptographic scheme to communicate with each other over a channel 106. In the example shown, a quantum-enabled adversary 108 has access to information exchanged on the channel 106. A communication system may include additional or different features, and the components in a communication system may be configured to operate as shown or in another manner.

In some implementations, the nodes 102, 104 have a server-client relationship. For example, the node 102 can be a server and the node 104 can be its client in a served network, or vice-versa. In some implementations, the nodes 102, 104 have a peer-to-peer relationship. For example, the nodes 102, 104 can be peers in a peer-to-peer network. The nodes 102, 104 may have another type of relationship in the communication system 100.

The example nodes 102, 104 each have computational resources (e.g., hardware, software, firmware) that are used to communicate with other nodes. In some implementations, the nodes 102, 104 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112 and an interface 114. Each of the nodes 102, 104 may include the same, additional or different components, and the nodes 102, 104 may be configured to operate as shown and described with respect to FIG. 1 or in another manner.

In the example node 102 shown in FIG. 1, the memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or both of FIGS. 2 and 3.

In the example node 102 shown in FIG. 1, the processor 112 can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in one or both of FIGS. 2 and 3.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes or devices. In some cases, the interface 114 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. In some examples, the channel 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptography systems are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptosystems that are believed to be invulnerable to quantum attack. For example, the "New Hope" protocol discussed above has been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner.

The example quantum-enabled adversary 108 shown in FIG. 1 can access information exchanged on the channel 106. For example, the quantum-enabled adversary 108 may access some or all of the information sent from the node 102 to the node 104 or to another recipient. In some instances, the quantum-enabled adversary 108 can directly observe correspondence between the nodes 102, 104; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms or perform other classically-hard computational tasks fast enough to compromise the security of certain cryptographic algorithms. For example, the quantum-enabled adversary 108 may be capable of computing prime factors fast enough to compromise certain RSA encryption standards or computing discrete logarithms fast enough to compromise certain ECC encryption standards.

In the example shown in FIG. 1, the nodes 102, 104 can use quantum-resistant cryptographic protocols that cannot be compromised by the example quantum-enabled adversary 108. For instance, the nodes 102, 104 may use a cryptographic protocol that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol that is also secure against attacks by the quantum-enabled adversary 108.

In some implementations, the nodes 102, 104 use a lattice-based cryptography scheme in their communications over the channel 106. The security of lattice-based cryptography schemes is based on the apparent hardness of certain problems on point lattices in $\mathbb{R}^n$. Some lattice-based cryptography schemes are believed to be secure against quantum-enabled adversaries. For example, it is believed that no efficient quantum algorithms are known for the hard problems typically used in lattice-based cryptography. Examples of lattice-based cryptography techniques include learning-with-errors-based (LWE) key agreement protocols, LWE encryption protocols, ring-learning-with-errors-based (Ring-LWE or RLWE) key agreement protocols, Ring-LWE encryption protocols, ring-learning-with-rounding-based (Ring-LWR or RLWR) key agreement protocols, Ring-LWR encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) protocols, ring-TESLA protocols, and others.

Lattice-based cryptography schemes may define one or more arrays of integers. For instance, a lattice-based cryptography scheme may define a ring of integer polynomials, where each integer coefficient is reduced by a modulus q. As an example, a ring element in a lattice-based cryptography scheme may be defined by the quotient ring $R_q = \mathbb{Z}_q[x]/(x^n+1)$, where $\mathbb{Z}_q = \{0, \ldots, q+1\}$. An array of the integer coefficients can be used as a parameter in some lattice-based cryptography schemes. For example, an array of randomly-selected nonnegative integers, each less than the modulus q, is used as a public parameter in some lattice-based key agreement protocols. The array of randomly-selected integers, each less than the modulus q, can be generated based on the output of a pseudorandom number generator (e.g., a pseudorandom bit stream) or another source of randomness. The array can be combined with other values (e.g., a secret value, other system parameters, etc.) in a key agreement protocol to generate a shared secret. For instance, the "New Hope" proposal provides an example algorithm for generating a shared secret based on an array of randomly-selected integers that are each less than modulus value q=12289. The array of integers in the New Hope proposal can thus be viewed as an n-element (where n=1024) array of integers in $\{0, \ldots, 12288\}$.

Many cryptographic protocols, including lattice-based cryptography schemes, call for the use of modular reduction operations. For example, given an input integer $\alpha$, cryptographic protocols may call for the determination of an integer r that is the remainder of an integer modulus q divided by $\alpha$. Determining an exact or unique remainder in such a modular reduction operation may require significant computational resources, and may become a bottleneck in the performance of a cryptographic protocol.

Accordingly, some cryptographic protocols may call for the use of an approximate modular reduction operation in lieu of exact modular reduction operations. An approximate modular reduction operation may determine an approximate remainder r' instead of the unique remainder r, where r' need not be less than the modulus q. Rather, the output r' of the approximate reduction operation may be congruent to r (i.e., r'≡α(mod q)) and that 0≤r'<A for some positive integer A ≥q, but not much larger than q. The input integer $\alpha$ may be a b-bit integer such that $0 \leq \alpha < 2^b$, and the result of intermediate computations in the approximate modular reduction operation may fit within a word size w such that those values may be properly handled by the bit registers of computer systems executing the operation.

One example of an approximate modular reduction operation is a Barrett-type modular reduction. A Barrett-type modular reduction may be used to perform modular reduction operations in cryptographic protocols. For example, a Barrett-type modular reduction may be performed in the context of a transformation applied in lattice-based cryptographic protocols. A Barrett-type modular reduction may refer to a modular reduction operation that utilizes a numerator and denominator that closely approximates the inverse of a modulus value q to determine an approximate remainder r' that is congruent to $\alpha$ mod q. For instance, a first constant x and second constant d may be chosen such that the following condition is met:

$$\frac{x}{2^d} \approx \frac{1}{q}.$$

A Barrett-type modular reduction becomes more accurate as the approximation according to the above equation becomes closer to equivalency. In addition, with a close approximation according to the above equation, the Barrett-type modular reduction may accommodate larger input bit lengths b and may provide better accuracy A that can be supported by the chosen first constant x and the second constant d.

In addition to a close approximation according to the equation above, in some implementations, the following condition is placed in the first constant x and the second constant d in order to result in an output r'≥0:

$$\frac{x}{2^d} \leq \frac{1}{q}.$$

Furthermore, in some implementations, the following condition may be placed on the first constant x and the second constant d such that the output of the Barrett-type modular reduction is less than A (r'<A):

$$\frac{x}{2^d} \geq \frac{1}{q} - 2^{-b}\left(\frac{A}{q} - 1\right).$$

In some implementations, the list of parameters in Table 1 below is used in a Barrett-type modular reduction. The parameters may be used in a Barrett-type modular reduction that is performed in an implementation of an NTT or inverse-NTT, such as implementations 200, 300 of FIGS. 2, 3. The parameters in Table 1 may satisfy each of the conditions above, and may be used in a Barrett-type modular reduction to achieve one or more advantages of the present disclosure. For instance, the parameters in Table 1 may be used in a Barrett-type modular reduction to reduce the amount of modular reduction operations performed in implementations of an NTT or inverse-NTT, which may be used in some lattice-based cryptographic protocols.

TABLE 1

Figure 2:
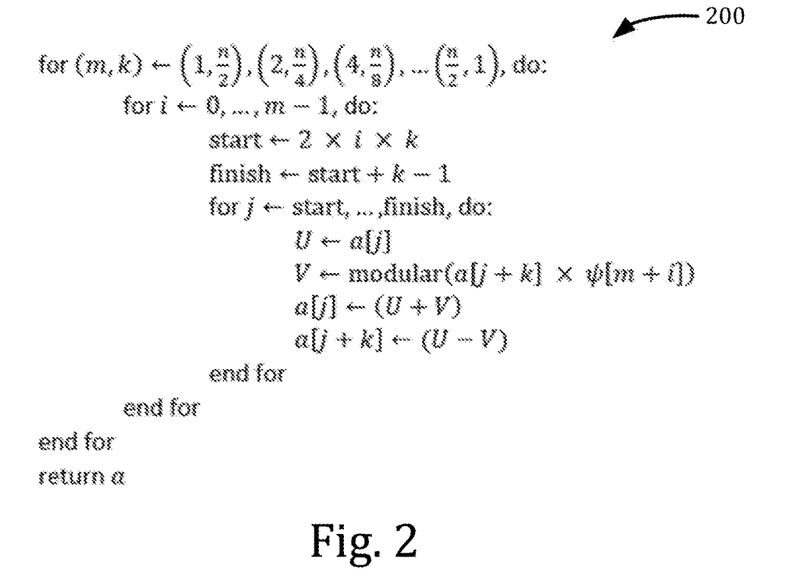
FIG. 2 is an example implementation of an number theoretic transformation (NTT).
Figure 3:
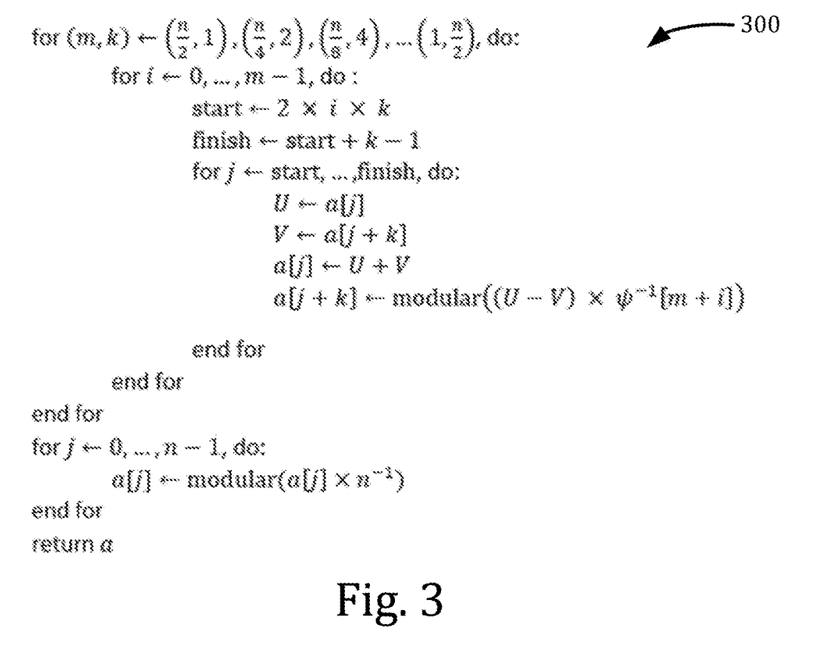
FIG. 3 is an example implementation of an inverse-NTT.

| | |
|---|---|
| a | 12289 |
| b | 36 |
| A | 12403 |
| w | 64 |
| x | 22367801 |
| d | 38 |

Other parameter selections may also be used to achieve such advantages. For example, another choice of parameters may satisfy the conditions listed above, and may be used in a Barrett-type modular reduction to reduce the amount of modular reduction operations performed in implementations of an NTT or inverse-NTT.

In some implementations, a Barrett-type modular reduction performs the following steps or operations that are mathematically equivalent to the following steps. The input α may first be multiplied by the first constant x to arrive at a first intermediate value (e.g., u←α×x). The first constant x may be chosen such that the first intermediate value u and other intermediate values in the operations of the modular reduction fit within a particular word length w, which may be based on a bit register capacity of a computer system performing the Barrett-type modular reduction. A bit shift operation may then be applied to the first intermediate value to yield a second intermediate value. The bit shift operation may be applied to a value by dropping one or more lowest-order bits in a binary representation of the value. The number of bits may be based on a second constant; for instance, a bit shift of d bits may be applied to a binary value by dropping the d lowest-order bits from the binary value. In such instances, the bit shift is mathematically equivalent to dividing the first intermediate value by the second constant as a power of two, $2^d$, and rounding the result to a nearest integer that is less than or equal to the result (e.g., u'←⌊u/$2^d$⌋, where ⌊•⌋ refers to the floor rounding operation that rounds an input to the nearest integer that is less than or equal to the input). The result of the bit shift operation may then be multiplied by the modulus q and then subtracted from the input α to yield an output (e.g., r'←α−u'×q) that is congruent to the unique remainder α modulus q.

In some implementations, a Barrett-type modular reduction performs the following steps or operations that are mathematically equivalent to the following steps. The following steps may be implemented in a manner that is mathematically equivalent to the steps in the preceding paragraph. The input α and the first constant x may be input to a mulhi() function to arrive at a first intermediate value (e.g., u←mulhi(α×x)). The mulhi() function may by any suitable function that takes as input two 32-bit integers and produces as output the high-order 32 bits of a 64-bit integer obtained by multiplying the two input integers together. The first intermediate value produced by the mulhi() function may be multiplied by the modulus q and then subtracted from the input α to yield an output (e.g., r'←α−u×q) that is congruent to the unique remainder of the division of the input α by the modulus value q. Such implementations may accommodate a 32-bit computer architecture with word size w=32. In some instances, the second constant d may be chosen to match the word size d=w=32, and the first constant x may have a bit length x not exceeding 32 bits. With such a choice for the constants x, d, multiplication operations in a Barrett-type modular reduction may be implemented by a single 32-bit mulhi() function without exceeding or overflowing the 32-bit word size limit.

In some implementations, a Barrett-type modular reduction performs the following steps or operations that are mathematically equivalent to the following steps. The following steps may be implemented in a manner that is mathematically equivalent to the steps in the preceding paragraph. An initial bit shift of e bits may be performed to yield a first intermediate value (e.g., u←⌊α/$2^e$⌋). The initial bit shift reduces the bit length of the input α, which may prevent intermediate values determined in the remaining reduction operations from overflowing the w-bit machine register. The result of the initial bit shift operation may then be multiplied by the first constant x to arrive at a second intermediate value (e.g., u'←u×x). A second bit shift operation may then be applied to the second intermediate value, which may have the effect of shifting by the total number of bits specified by the second constant d (in other words, the second intermediate value may be shifted by (d−e) bits) (e.g., u"←⌊u'/$2^{d-e}$⌋). The result of the second bit shift operation may then be multiplied by the modulus value q, which may then be subtracted from the input α to yield an output (e.g., r'←α−u"×q) that is congruent to the unique remainder of the division of the input α by the modulus value q.

A Barrett-type modular reduction may be used in the application of a transformation, such as in an implementation of an NTT or inverse-NTT. An implementation of an NTT may generally refer to a set of operations that computes the NTT for a given input. Likewise, an implementation of an inverse-NTT may generally refer to a set of operations that computes the inverse-NTT for a given input. Because an NTT may be considered as a discrete Fourier transform (DFT) computed over a finite field, the NTT may be computed using implementations of a fast Fourier transform (FFT) that work over the finite field. Thus, some implementations of an NTT may include implementations of an FFT that work over the finite field.

Implementations that compute an NTT over a finite field (e.g., a quotient ring in Ring-LWE cryptography systems) may call for certain roots of unity. For example, lattice-based cryptography systems may utilize parameters n and q as described above, where n is a power of two and q is a prime with q≡1(mod 2n). An implementation of an NTT may accordingly need 2n-th roots of unity to exist modulo q, imposing a congruence condition of q≡1(mod 2n). An input array $\alpha=(\alpha[0], \ldots, \alpha[n-1]) \in \mathbf{Z}_q^n$ may be used in implementations of an NTT, along with a primitive n-th root of unity $\omega$ in $\mathbf{Z}_q^n$ (which means that $\omega^n \equiv 1 \pmod{q}$). A forward NTT transformation $\tilde{\alpha}=\mathrm{NTT}(\alpha)$ may include:

$$\tilde{a}[i] = \sum_{j=0}^{n-1} a[j]\omega^{ij} \bmod q$$

for i=0,1, . . . , n−1, and an inverse-NTT transformation $b=\mathrm{NTT}^{-1}(\tilde{\alpha})$ may include:

$$b[i] = n^{-1}\sum_{j=0}^{n-1} \tilde{a}[j]\omega^{-ij} \bmod q$$

for i=0,1, . . . , n−1. For these functions, the following may be true:

$\mathrm{NTT}^{-1}(\mathrm{NTT}(\alpha))=\alpha$.

Implementations of an NTT or inverse-NTT may be used in lattice-based cryptography systems, for example, in the multiplication of ring elements. Multiplication of two ring elements may be a performance bottleneck in Ring-LWE based cryptographic protocols. In certain polynomial rings, such as the ring $R_q=\mathbf{Z}_q[x]/(x^n+1)$, there may be specialized algorithms to compute the product of two ring elements that are much faster than generic multiplication algorithms. Such specialized algorithms may utilize an NTT or inverse-NTT, and the performance bottleneck of such algorithms may be the application of the NTT or inverse-NTT to the ring elements. Thus, improvements in the performance of implementations of an NTT and inverse-NTT may yield significant performance gains in the overall performance of a cryptographic protocol.

Because applying an NTT generally provides a cyclic convolution, computing the product c=α·b mod (x^n+1) in a lattice-based cryptography system where α, b are ring elements of the quotient ring $R_q=\mathbf{Z}_q[x]/(x^n+1)$ may call for an implementation of an NTT of length 2n with n zeroes being appended to each input α, b. To avoid this, a transformation array may be used that is based on a primitive root of unity. For example, a transformation array may be based on a primitive 2n-th root of unity $\psi$ in $\mathbf{Z}_q$ where $\psi^2=\omega$. Where inputs to an NTT are $\alpha=(\alpha[0], \ldots, \alpha[n-1]) \in \mathbf{Z}_q^n$ and $b=(b[0], \ldots, b[n-1]) \in \mathbf{Z}_q^n$, arrays $\tilde{\alpha}=(\alpha[0], \psi\alpha[1]\ldots, \psi^{n-1}\alpha[n-1])$ and $\tilde{b}=(b[0], \psi b[1]\ldots, \psi^{n-1}[n-1])$ may be defined such that the negative wrapped convolution:

$c=(1,\psi^{-1},\psi^{-2},\ldots,\psi^{-(n-1)}) \circ \mathrm{NTT}^{-1}(\mathrm{NTT}(\hat{\alpha}) \circ \mathrm{NTT}(\hat{b}))$ may satisfy c=α·b in $R_q$ (where $\circ$ refers to component-wise multiplication of the arrays), allowing a full polynomial multiplication in lattice-based cryptography systems using implementations of an NTT or inverse-NTT.

In some implementations, for efficiency reasons, the input array to an implementation of an NTT or inverse-NTT may be in bit-reversed order. Bit-reversed order may refer to a rearrangement of the order of the entries in the input array, which may be applied to the array using a permutation referred to as a bit-reversal. A bit-reversal may swap the entry of α in the ith position with that of the $\hat{i}$th position where $\hat{i}$ is the integer whose binary representation is the reverse of that of i. For example, for an array of dimension n=8 the indices 0, . . . , 7 of the entries α[0], . . . , a[7] of α can be written in binary as 000,001,010,011,100,101,110,111

Written in bit-reversed order, these binary representations are 000,100,010,110,001,101,011,111.

Written in decimal notation, these indices are 0,4,2,6,1, 5,3,7. Thus, the bit-reversed array â of a is given by $\hat{\alpha}=(\alpha[0],\alpha[4],\alpha[2],\alpha[6],\alpha[1],\alpha[5],\alpha[3],\alpha[7])$.

In some instances, an implementation of an NTT may use a bit-reversal permutation in order to produce an array NTT(α) with entries in the proper order. In some instances, it is possible to work directly with an array whose entries are sorted in bit-reversed order, potentially eliminating the need for one or more bit-reversal permutations.

FIG. 2 is an example implementation 200 of an NTT. In some instances, the example implementation 200 can be executed by a computer system. For example, the implementation 200 may be performed by either of the nodes 102, 104 shown in FIG. 1 or by another type of computer system. In some cases, for instance, computer-readable instructions associated with the example implementation 200 are stored in memory and executed by one or more processors.

The implementation 200 may utilize the following parameters in some instances: a power-of-two dimension n=1024, a prime modulus value q=12289, where q≡1 (mod 2n), and a primitive nth root of unity $\psi$=49. In the example shown, the implementation 200 uses a Cooley-Tukey butterfly operation, and utilizes a modular reduction operation (represented by modular(·) in FIG. 2) which takes an input integer α and returns an output that is congruent to α(mod q). In some implementations, the modular reduction operation modular(·) is a Barrett-type modular reduction. The transformation array $\psi$ for the implementation 200 may be defined as $\psi=(\psi[0], \ldots, \psi[n-1]) \in \mathbf{Z}_q^n$, and the transformation array $\psi$ may be in bit-reversed order. In the example shown, each element of $\psi$ is a power of $\sqrt{\omega} \equiv 7 \pmod{q}$, and the transformation array 104 is the bit-reversed permutation of the array $(1, \sqrt{\omega},(\sqrt{\omega})^2, \ldots, (\sqrt{\omega})^{n-1})$.

The input to the implementation 200 is an array of integers. The array of integers may be defined for a lattice-based cryptography system, and may be obtained in any suitable manner. For example, the array may be retrieved from memory, or may be received from another node in a communication system. The array may be defined, for instance, as $\alpha=(\alpha[0], \ldots, \alpha[n-1]) \in \mathbf{Z}_q^n$. In some implementations, the array is a ring element of a quotient ring defined for the lattice-based cryptography system. For example, the array may be a ring element defined by the quotient ring $R_q=\mathbb{Z}_q[x]/(x_n+1)$, where $\mathbb{Z}_q=\{0,\ldots,q-1\}$. The input array may be in standard order, and not in a bit-reversed order as described above. The output of the implementation 200 is an NTT-transformed array in bit-reversed order (e.g., the output array may be $\alpha \leftarrow \text{NTT}(\alpha)$ in bit-reversed order).

FIG. 3 is an example implementation 300 of an inverse-NTT. In some instances, the example implementation 300 can be executed by a computer system. For example, the implementation 300 may be performed by either of the nodes 102, 104 shown in FIG. 1 or by another type of computer system. In some cases, for instance, computer-readable instructions associated with the example implementation 300 are stored in memory and executed by one or more processors.

The implementation 300 may utilize the following parameters in some instances: a power-of-two dimension n=1024, a prime modulus value q=12289, where q≡1 (mod 2n), and a primitive nth root of unity ω=49. In the example shown, the implementation 300 uses a Gentleman-Sande butterfly operation, and utilizes a modular reduction operation (represented by modular(·) in FIG. 3) which takes an input integer α and returns an output that is congruent to α(mod q). In some implementations, the modular reduction operation modular(·) is a Barrett-type modular reduction. The transformation array for the implementation 300 may be defined as $\psi^{-1}=(\psi^{-1}[0],\ldots,\psi^{-1}[n-1]) \in \mathbb{Z}_q^n$, and the transformation array $\psi^{-1}$ may be in bit-reversed order. In the example shown, each element of $\psi^{-1}$ is a power of $(\sqrt{\omega})^{-1} \equiv 8778 \pmod{q}$, and the transformation array $\psi$ is the bit-reversed permutation of the array $(1,(\sqrt{\omega})^{-1}, (\sqrt{\omega})^{-2},\ldots,(\sqrt{\omega})^{-(n-1)})$.

The input to the implementation 300 is an array of integers. The array of integers may be defined for a lattice-based cryptography system, and may be obtained in any suitable manner. For example, the array may be retrieved from memory, or may be received from another node in a communication system. The array may be defined, for instance, as $\alpha=(\alpha[0],\ldots,\alpha[n-1]) \in \mathbb{Z}_q^n$. In some implementations, the array is a ring element of a quotient ring defined for the lattice-based cryptography system. For example, the array may be a ring element defined by the quotient ring $R_q=\mathbb{Z}_q[x]/(x^n+1)$, where $\mathbb{Z}_q=\{0,\ldots,q-1\}$. The input array may be in a bit-reversed order as described above. The output of the implementation 300 may be an inverse-NTT-transformed array in standard order (e.g., the output array may be $\alpha \leftarrow \text{NTT}^{-1}(\alpha)$ in standard order). In the example shown, a modular reduction operation is performed on the output array to scale each entry of the output array by $n^{-1} \equiv 12277 \pmod{q}$.

The Cooley-Tukey butterfly operation of implementation 200 may absorb the powers of $\psi$ in bit-reversed ordering, and implementation 200 may accordingly accept inputs in standard order (not bit-reversed) while producing outputs in bit-reversed order. The Gentleman-Sande butterfly operation of implementation 300 may absorb the powers of $\psi^{-1}$ in bit-reversed ordering, and implementation 300 may accordingly accept inputs in bit-reversed order while producing outputs in standard order. By using a Cooley-Tukey butterfly operation in implementation 200 and a Gentleman-Sande butterfly operation in implementation 300 as shown, the implementations 200, 300 may be used in lattice-based cryptographic protocols without the need to perform computationally-expensive bit-reversal permutations. For example, the New Hope protocol may be modified to utilize implementations 200, 300 such that arrays may be used in their natural order and without bit-reversal permutations.

By selecting particular parameters, the modular reduction operations implementations 200, 300 are applied after multiplication operations and are not required after addition operations. For instance, by selecting the first constant x and the second constant d according to the conditions discussed above (e.g., the parameters in Table 1), a Barrett-type modular reduction is applied in implementations 200, 300 only after multiplication operations without the need to perform modular reductions after addition operations. Thus, by selecting parameters meeting the conditions discussed above (e.g., those in Table 1), the total amount of modular reduction operations performed during implementations of an NTT and inverse-NTT may be reduced. Accordingly, the total amount of modular reduction operations performed during cryptographic protocols that may use implementations of an NTT and inverse-NTT (e.g., lattice-based cryptographic protocols, such as the New Hope protocol) may be reduced, yielding significant savings in the computational resources needed to perform such protocols.

In some implementations, 36-bit integer inputs may be accepted by the modular reductions in implementations 200, 300. For example, inputs to some lattice-based cryptography protocols may be arrays comprising integers modulo q. Where q=12289, such as in the New Hope protocol, these integers may be 14-bit integers (since $12289 < 2^{14}$). In implementations 200, 300, intermediate integer values from addition operations may grow as large as 22 bits before the modular reduction is performed after the multiplication operation. Because multiplication of a 22-bit integer by another 14-bit integer yields a 36-bit integer (to which the modular reduction is applied in implementations 200, 300), a modular reduction used after multiplication operations may need to support 36-bit input integers. The parameters listed in Table 1 above may thus include b=36 (the bit length of the integer input to the Barrett-type modular reduction). In implementations using a Barrett-type modular reduction with parameter $A=12403 < 2^{14}$, the output to the Barrett-type modular reduction is guaranteed to be a 14-bit integer. Accordingly, each Barrett-type modular reduction applied in implementation 200 or 300 may reset the bit length of an intermediate integer to its original value of 14 bits. Thus, in implementations 200, 300, when b=36, the integers reduced by the modular reduction operations do not exceed 36 bits in length.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, approximate modular reductions are applied in cryptographic protocols.

In a first example, a lattice-based cryptography method includes obtaining an array of integers ($\alpha = (\alpha[0], \ldots, \alpha[n-1]) \in \mathbb{Z}_q^n$) in a lattice-based cryptography system, and applying a transformation to the array of integers. Applying the transformation includes applying a modular reduction to a product of a first integer and a second integer. The first integer is based on the array of integers, and the second integer is based on the transformation. Applying the modular reduction includes performing operations mathematically equivalent to multiplying the product by a first constant (x) to yield a first intermediate value (u=60 x), applying a bit shift operation to the first intermediate value to yield a second intermediate value ($u' = \lfloor u/2^d \rfloor$), multiplying the second intermediate value by a modulus value (q) to yield a third intermediate value (u'q), and subtracting the third intermediate value from the product (r=α−u'q). The bit shift operation is based on a second constant (d).

Implementations of the first example may include one or more of the following features. Applying the transformation may include applying a number theoretic transform (NTT) or an inverse-NTT. The bit shift operation may be a second bit shift operation ($u' = \lfloor (ux)/2^{d-e} \rfloor$), and applying the modular reduction may include applying a first bit shift operation to the product ($u = \lfloor \alpha/2^e \rfloor$) before multiplying by the first constant (x). The array of integers may be a ring element of a quotient ring defined for the lattice-based cryptography system, and the first integer may be based on one or more coefficients of the ring element. The second integer may be a constant value from a transformation array, and the transformation array may be an array of constant integers based on a primitive root of unity ($\psi = (\psi[0], \ldots, \psi[n-1]) \in \mathbb{Z}_q^n$ of powers of $\sqrt{\omega} \equiv 7 \pmod{q}$; or $\psi^{-1} = (\psi^{-1}[0], \ldots, \psi^{-1}[n-1]) \in \mathbb{Z}_q^n$ of powers of $(\sqrt{\omega})^{-1} \equiv 8778 \pmod{q}$).

Implementations of the first example may include one or more of the following features. The product may be a 36-bit integer, and a bit length of the first intermediate value ($u=\alpha x$) is less than or equal to 64-bits. Applying the bit shift operation to the first intermediate value may include shifting the first intermediate value by a number of bits equal to the second constant (d). Applying the bit shift operation may be mathematically equivalent to dividing the first intermediate value by the second constant as a power of two ($2^d$). The first constant (x) may be 22367801, the modulus value (a) may be 12289, and the second constant (d) may be 38.

In a second example, a lattice-based cryptography method includes obtaining an array of integers in a lattice-based cryptography system ($\alpha=(\alpha[0], \ldots, \alpha[n-1]) \in \mathbb{Z}_q^n$), and applying a transformation to the array of integers. Applying the transformation may include applying a Barrett-type modular reduction to a product of a first integer and a second integer. The first integer is based on the array of integers, and the second integer is based on the transformation.

Implementations of the second example may include one or more of the following features. Applying the Barrett-type modular reduction may include operations that are mathematically equivalent to multiplying the product by a first constant (x) to yield a first intermediate value ($u=\alpha x$), applying a bit shift operation to the first intermediate value to yield a second intermediate value ($u'=\lfloor u/2^d \rfloor$), multiplying the second intermediate value by a modulus value (a) to yield a third intermediate value ($u'q$), and subtracting the third intermediate value from the product ($r=\alpha-u'q$). Applying the Barrett-type modular reduction may include operations that are mathematically equivalent to applying a first bit shift operation to the product to yield a first intermediate value ($u=\lfloor \alpha/2^e \rfloor$), multiplying the product by a first constant (x) to yield a second intermediate value ($u'=ux$), applying a second bit shift operation to the second intermediate value to yield a third intermediate value ($u''=\lfloor u'/2^{d-e} \rfloor$), multiplying the third intermediate value by a modulus value (q) to yield a fourth intermediate value ($u''q$), and subtracting the fourth intermediate value from the product ($r'=\alpha-u'q$).

Implementations of the second example may include one or more of the following features. Applying the transformation may include applying a number theoretic transform (NTT) or an inverse-NTT. The array of integers may be a ring element of a quotient ring defined for the lattice-based cryptography system, and the first integer may be based on one or more coefficients of the ring element. The second integer may be a constant value from a transformation array, and the transformation array may be an array of constant integers based on a primitive root of unity.

In some implementations, a computing system includes a data processing apparatus and a computer-readable medium storing instructions that are operable when executed by the data processing apparatus to perform one or more operations of the first example or the second example or both. In some implementations, a computer-readable medium stores instructions that are operable when executed by a data processing apparatus to perform one or more operations of the first example or the second example or both.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A lattice-based cryptography method, comprising:
   obtaining an array of integers defined for a lattice-based cryptography system;
   by operation of one or more processors, applying a transformation to the array of integers, wherein applying the transformation comprises applying a Barrett-type modular reduction to a product of a first integer and a second integer, the first integer based on the array of integers, the second integer based on the transformation, wherein applying the Barrett-type modular reduction comprises operations mathematically equivalent to:
      multiplying the product by a first constant to yield a first intermediate value, wherein the first constant is 22367801;
      applying a bit shift operation to the first intermediate value to yield a second intermediate value, the bit shift operation based on a second constant, wherein the second constant is 38;
      multiplying the second intermediate value by a modulus value to yield a third intermediate value, wherein the modulus value is 12289; and
      subtracting the third intermediate value from the product;
   wherein the operations prevent the respective lengths of the first, second, and third intermediate values from exceeding a bit register capacity of the one or more processors; and
   using a result of the transformation in a key agreement protocol of the lattice-based cryptography system.

2. The method of claim 1, wherein applying the transformation comprises applying a number theoretic transform (NTT) or an inverse-NTT.

3. The method of claim 1, wherein the bit shift operation is a second bit shift operation, and applying the modular reduction comprises applying a first bit shift operation to the product before multiplying by the first constant.

4. The method of claim 1, wherein:
   the array of integers is a ring element of a quotient ring defined for the lattice-based cryptography system; and
   the first integer is based on one or more coefficients of the ring element.

5. The method of claim 1, wherein the second integer is a constant value from a transformation array, and the transformation array comprises an array of constant integers based on a primitive root of unity.

6. The method of claim 1, wherein the product is a 36-bit integer, and a bit length of the first intermediate value is less than or equal to 64-bits.

7. The method of claim 1, wherein applying the bit shift operation to the first intermediate value comprises shifting the first intermediate value by a number of bits equal to the second constant.

8. The method of claim 1, wherein the lattice-based cryptography system defines a modulus q, and applying the modular reduction comprises reducing by the modulus q.

9. A lattice-based cryptography method, comprising:
obtaining an array of integers defined for a lattice-based cryptography system;
by operation of one or more processors, applying a transformation to the array of integers, wherein applying the transformation comprises applying a Barrett-type modular reduction to a product of a first integer and a second integer, the first integer based on the array of integers, the second integer based on the transformation, wherein operations of the Barrett-type modular reduction prevent intermediate values from exceeding a bit register capacity of the one or more processors and applying the Barrett-type modular reduction comprises operations that are mathematically equivalent to:
applying a first bit shift operation to the product to yield a first intermediate value;
multiplying the product by a first constant to yield a second intermediate value;
applying a second bit shift operation to the second intermediate value to yield a third intermediate value;
multiplying the third intermediate value by a modulus value to yield a fourth intermediate value; and
subtracting the fourth intermediate value from the product; and
using a result of the transformation in a key agreement protocol of the lattice-based cryptography system.

10. The method of claim 9, wherein applying the transformation comprises applying a number theoretic transform (NTT) or an inverse-NTT.

11. The method of claim 9, wherein:
the array of integers is a ring element of a quotient ring defined for the lattice-based cryptography system; and
the first integer is based on one or more coefficients of the ring element.

12. The method of claim 9, wherein the second integer is a constant value from a transformation array, and the transformation array comprises an array of constant integers based on a primitive root of unity.

13. The method of claim 9, wherein the lattice-based cryptography system defines a modulus q, and applying the modular reduction comprises reducing by the modulus q.

14. A computing system comprising:
a data processing apparatus;
a computer-readable medium storing instructions that are operable when executed by the data processing apparatus to perform operations comprising:
obtaining an array of integers defined for a lattice-based cryptography system;
applying a transformation to the array of integers, wherein applying the transformation comprises applying a Barrett-type modular reduction to a product of a first integer and a second integer, the first integer based on the array of integers, the second integer based on the transformation, wherein applying the Barrett-type modular reduction comprises operations mathematically equivalent to:
multiplying the product by a first constant to yield a first intermediate value, wherein the first constant is 22367801;
applying a bit shift operation to the first intermediate value to yield a second intermediate value, the bit shift operation based on a second constant, wherein the second constant is 38;
multiplying the second intermediate value by a modulus value to yield a third intermediate value, wherein the modulus value is 12289; and
subtracting the third intermediate value from the product;
wherein the operations prevent the respective lengths of the first, second, and third intermediate values from exceeding a bit register capacity of the data processing apparatus; and
using a result of the transformation in a key agreement protocol of the lattice-based cryptography system.

15. The computing system of claim 14, wherein applying the transformation comprises applying a number theoretic transform (NTT) or an inverse-NTT.

16. The computing system of claim 14, wherein the bit shift operation is a second bit shift operation, and applying the modular reduction comprises applying a first bit shift operation to the product before multiplying by the first constant.

17. The computing system of claim 14, wherein:
the array of integers is a ring element of a quotient ring defined for the lattice-based cryptography system; and
the first integer is based on one or more coefficients of the ring element.

18. The computing system of claim 14, wherein the second integer is a constant value from a transformation array, and the transformation array comprises an array of constant integers based on a primitive root of unity.

19. The computing system of claim 14, wherein the product is a 36-bit integer, and a bit length of the first intermediate value is less than or equal to 64-bits.

20. The computing system of claim 14, wherein applying the bit shift operation to the first intermediate value comprises shifting the first intermediate value by a number of bits equal to the second constant.

21. A computing system comprising:
a data processing apparatus;
a computer-readable medium storing instructions that are operable when executed by the data processing apparatus to perform operations comprising:
obtaining an array of integers defined for a lattice-based cryptography system;
applying a transformation to the array of integers, wherein applying the transformation comprises applying a Barrett-type modular reduction to a product of a first integer and a second integer, the first integer based on the array of integers, the second integer based on the transformation, wherein operations of the Barrett-type modular reduction prevent intermediate values from exceeding a bit register capacity of the data processing apparatus and applying the Barrett-type modular reduction comprises operations that are mathematically equivalent to:
applying a first bit shift operation to the product to yield a first intermediate value;
multiplying the product by a first constant to yield a second intermediate value;
applying a second bit shift operation to the second intermediate value to yield a third intermediate value;

multiplying the third intermediate value by a modulus value to yield a fourth intermediate value; and
subtracting the fourth intermediate value from the product; and
using a result of the transformation in a key agreement protocol of the lattice-based cryptography system.

22. The computer system of claim 21, wherein applying the transformation comprises applying a number theoretic transform (NTT) or an inverse-NTT.

23. The computer system of claim 21, wherein:
the array of integers is a ring element of a quotient ring defined for the lattice-based cryptography system; and
the first integer is based on one or more coefficients of the ring element.

24. The computer system of claim 21, wherein the second integer is a constant value from a transformation array, and the transformation array comprises an array of constant integers based on a primitive root of unity.

* * * * *

UNITED STATES PATENT AND TRADEMARK OFFICE
CERTIFICATE OF CORRECTION

PATENT NO. : 9,942,039 B1
APPLICATION NO. : 15/267445
DATED : April 10, 2018
INVENTOR(S) : Gustav Michael Gutoski and Shane Daniel Kelly Page 1 of 3

It is certified that error appears in the above-identified patent and that said Letters Patent is hereby corrected as shown below:

On the Title Page

Item (71) Applicant, Line 1, After "Waterloo", insert --, ON--

In the Specification

Column 1, Detailed Description, Line 59, Delete "α," and insert --a,-- therefor
Column 1, Detailed Description, Line 60, Delete "0≤r≤q)" and insert --0≤r<q)-- therefor
Column 1, Detailed Description, Line 61, Delete "α" and insert --a-- therefor
Column 1, Detailed Description, Line 65, Delete "α" and insert --a-- therefor
Column 1, Detailed Description, Line 65, Delete "r'≡α(mod q))," and insert --r'≡a(mod q)),-- therefor
Column 6, Detailed Description, Line 9, Delete "q+1}." and insert --q-1}.-- therefor
Column 6, Detailed Description, Line 28, Delete "α," and insert --a,-- therefor
Column 6, Detailed Description, Line 31, Delete "α." and insert --a.-- therefor
Column 6, Detailed Description, Line 42, Delete "r'≡α(mod q))" and insert --r'≡a(mod q))-- therefor
Column 6, Detailed Description, Line 43, Delete "α" and insert --a-- therefor
Column 6, Detailed Description, Line 44, Delete "0≤α<2b," and insert --0≤a<2b,-- therefor
Column 6, Detailed Description, Line 59, Delete "α" and insert --a-- therefor
Column 7, Detailed Description, Table 1, Line 1, Delete "a" and insert --q-- therefor
Column 7, Detailed Description, Line 59, Delete "α" and insert --a-- therefor
Column 7, Detailed Description, Line 60, Delete "u←α×x)." and insert --u←a×x).-- therefor
Column 8, Detailed Description, Line 14, Delete "α" and insert --a-- therefor
Column 8, Detailed Description, Line 14, Delete "r'←α-u'×q)" and insert --r'←a-u'×q)-- therefor
Column 8, Detailed Description, Line 15, Delete "α" and insert --a-- therefor
Column 8, Detailed Description, Line 21, Delete "α" and insert --a-- therefor
Column 8, Detailed Description, Line 23, Delete "u←mulhi(α×x))." and insert --u←mulhi(a×x)).-- therefor
Column 8, Detailed Description, Line 29, Delete "α" and insert --a-- therefor
Column 8, Detailed Description, Line 29, Delete "r'←α-u×q)" and insert --r'←a-u×q)-- therefor Signed and Sealed this
Thirteenth Day of November, 2018

Andrei Iancu
*Director of the United States Patent and Trademark Office*

CERTIFICATE OF CORRECTION (continued)
U.S. Pat. No. 9,942,039 B1

Column 8, Detailed Description, Line 31, Delete "$\alpha$" and insert --a-- therefor Column 8, Detailed Description, Line 46, Delete "$u \leftarrow \lfloor \alpha/2^e \rfloor$)." and insert --$u \leftarrow \lfloor a/2^e \rfloor$).-- therefor Column 8, Detailed Description, Line 47, Delete "$\alpha$," and insert --a,-- therefor
Column 8, Detailed Description, Line 59, Delete "$\alpha$" and insert --a-- therefor
Column 8, Detailed Description, Line 60, Delete "r'←$\alpha$-u"×q)" and insert --r'←a-u"×q)-- therefor
Column 8, Detailed Description, Line 61, Delete "$\alpha$" and insert --a-- therefor
Column 9, Detailed Description, Line 17, Delete "$\alpha=(\alpha[0], \ldots, \alpha[n-1])$" and insert --a=(a[0], ..., a[n-1])-- therefor Column 9, Detailed Description, Line 20, Delete "$\tilde{\alpha}=\text{NTT}(\alpha)$" and insert --ã=NTT(a)-- therefor Column 9, Detailed Description, Line 29, Delete "$b=\text{NTT}^{-1}(\tilde{\alpha})$" and insert --b=NTT$^{-1}$(ã)-- therefor Column 9, Detailed Description, Line 39, Delete "NTT$^{-1}$(NTT($\alpha$))=$\alpha$." and insert --NTT$^{-1}$(NTT(a))=a.-- therefor Column 9, Detailed Description, Line 56, Delete "c=$\alpha$·b" and insert --c=a·b-- therefor
Column 9, Detailed Description, Line 57, Delete "$\alpha$," and insert --a,-- therefor
Column 9, Detailed Description, Line 60, Delete "$\alpha$," and insert --a,-- therefor
Column 9, Detailed Description, Line 64, Delete "$\alpha=(\alpha[0], \ldots, \alpha[n-1])$" and insert --a=(a[0], ..., a[n-1])-- therefor Column 9, Detailed Description, Lines 65-66, Delete "$\alpha=(\alpha[0],\psi\alpha[1] \ldots, \psi^{n-1}\alpha[n-1])$" and insert --â=(a[0],ψa[1] ..., ψ$^{n-1}$a[n-1])-- therefor Column 10, Detailed Description, Lines 1-2, Delete "$c=(1,\psi^{-1},\psi^{-2},\ldots,\psi^{-(n-1)}) \circ \text{NTT}^{-1}(\text{NTT}(\hat{\alpha}) \circ \text{NTT}(b))$"

and insert --"$c = (1, \psi^{-1}, \psi^{-2}, \ldots, \psi^{-(n-1)}) \circ \text{NTT}^{-1}(\text{NTT}(\hat{a}) \circ \text{NTT}(\hat{b}))$"-- therefor Column 10, Detailed Description, Line 3, Delete "c=$\alpha$·b" and insert --c=a·b-- therefor
Column 10, Detailed Description, Line 13, Delete "$\alpha$" and insert --a-- therefor
Column 10, Detailed Description, Line 16, Delete "$\alpha$[0], ..., a[7]" and insert --a[0], ..., a[7]-- therefor
Column 10, Detailed Description, Line 17, Delete "$\alpha$" and insert --a-- therefor
Column 10, Detailed Description, Line 25, Delete "a" and insert --â-- therefor Column 10, Detailed Description, Line 27, Delete "$\hat{\alpha}=(\alpha[0],\alpha[4],\alpha[2],\alpha[6],\alpha[1],\alpha[5],\alpha[3],\alpha[7])$." and insert --"$\hat{a} = (a[0], a[4], a[2], a[6], a[1], a[5], a[3], a[7])$."-- therefor Column 10, Detailed Description, Line 30, Delete "NTT($\alpha$)" and insert --NTT(a)-- therefor
Column 10, Detailed Description, Line 45, Delete "ψ=49." and insert --ω=49.-- therefor
Column 10, Detailed Description, Line 49, Delete "$\alpha$" and insert --a-- therefor
Column 10, Detailed Description, Line 49, Delete "$\alpha$(mod" and insert --a(mod-- therefor
Column 10, Detailed Description, Line 56, Delete "104" and insert --ψ-- therefor
Column 10, Detailed Description, Line 64, Delete "$\alpha=(\alpha[0], \ldots, \alpha[n-1])$" and insert --a=(a[0], ..., a[n-1])-- therefor Column 11, Detailed Description, Line 1, Delete "$R_q=Z_q[x]/(x_n+1)$," and insert --$R_q=Z_q[x]/(x^n+1)$,-- therefor Column 11, Detailed Description, Line 5, Delete "$\alpha$←NTT($\alpha$)" and insert --a←NTT(a)-- therefor
Column 11, Detailed Description, Line 23, Delete "$\alpha$" and insert --a-- therefor
Column 11, Detailed Description, Line 23, Delete "$\alpha$(mod" and insert --a(mod-- therefor
Column 11, Detailed Description, Line 39, Delete "$\alpha=(\alpha[0], \ldots, \alpha[n-1])$" and insert

CERTIFICATE OF CORRECTION (continued)
U.S. Pat. No. 9,942,039 B1

--a=(a[0], ..., a[n-1])-- therefor
Column 11, Detailed Description, Line 47, Delete "α←NTT$^{-1}$(α)" and insert --a←NTT$^{-1}$(a)-- therefor
Column 14, Detailed Description, Lines 38-39, Delete "(α=(α[0], ..., α[n-1])" and insert
--(a=(a[0], ..., a[n-1])-- therefor
Column 14, Detailed Description, Line 47, Delete "(u=α x)," and insert --(u=ax),-- therefor
Column 14, Detailed Description, Line 52, Delete "(r=α-u'α)." and insert --(r=a-u'q).-- therefor
Column 14, Detailed Description, Line 60, Delete "$(u=\lfloor \alpha/2^e \rfloor)$," and insert
--$(u = \lfloor a/2^e \rfloor)$-- therefor
Column 15, Detailed Description, Line 6, Delete "(u=αx)" and insert --(u=ax)-- therefor
Column 15, Detailed Description, Line 12, Delete "(a)" and insert --(q)-- therefor
Column 15, Detailed Description, Line 16, Delete "(α=(α[0], ..., α[n-1])" and insert
--(a=(a[0], ..., a[n-1])-- therefor
Column 15, Detailed Description, Line 26, Delete "(u=αx)," and insert --(u=ax),-- therefor
Column 15, Detailed Description, Line 29, Delete "(a)" and insert --(q)-- therefor
Column 15, Detailed Description, Line 31, Delete "(r=α-u'q)." and insert --(r=a-u'q).-- therefor
Column 15, Detailed Description, Line 35, Delete "$(u=\lfloor \alpha/2^e \rfloor)$,," and insert --$(u = \lfloor a/2^e \rfloor)$,-- therefor
Column 15, Detailed Description, Line 41, Delete "(r'=α-u'q)." and insert --(r'=a-u"q).-- therefor